(12) United States Patent
Oleson et al.

(10) Patent No.: US 8,227,947 B2
(45) Date of Patent: Jul. 24, 2012

(54) ELECTRIC MOTOR FOR USE IN HAZARDOUS ENVIRONMENTS

(75) Inventors: John Christen Oleson, Placitas, NM (US); Andrew David Cook, Albuquerque, NM (US)

(73) Assignee: Stainless Motors, Inc., Rio Rancho, NM (US)

( * ) Notice: Subject to any disclaimer, the term of this patent is extended or adjusted under 35 U.S.C. 154(b) by 493 days.

(21) Appl. No.: 12/538,556

(22) Filed: Aug. 10, 2009

(65) Prior Publication Data

US 2011/0031830 A1    Feb. 10, 2011

(51) Int. Cl.
*H02H 5/12*   (2006.01)
(52) U.S. Cl. .......................................... 310/88; 310/89
(58) Field of Classification Search .............. 310/88–89, 310/71, 401–407, 415, 432
See application file for complete search history.

(56) References Cited

U.S. PATENT DOCUMENTS

| | | | | |
|---|---|---|---|---|
| 5,006,744 A | * | 4/1991 | Archer et al. | 310/89 |
| 5,245,237 A | * | 9/1993 | Fisher et al. | 310/89 |
| 5,430,338 A | * | 7/1995 | McMillan et al. | 310/89 |
| 6,223,416 B1 | * | 5/2001 | Boyd et al. | 29/596 |
| 6,278,206 B1 | * | 8/2001 | Yockey et al. | 310/71 |
| 6,933,640 B2 | * | 8/2005 | Schurter et al. | 310/85 |
| 7,069,137 B2 | * | 6/2006 | Miller | 701/100 |
| 7,156,191 B2 | * | 1/2007 | Lau | 173/216 |
| 7,404,450 B2 | * | 7/2008 | Izumisawa et al. | 173/93.5 |
| 7,492,071 B2 | * | 2/2009 | Chaohai et al. | 310/89 |
| 2003/0011257 A1 | * | 1/2003 | Akemakou | 310/91 |
| 2003/0020345 A1 | * | 1/2003 | Mooney | 310/90 |

* cited by examiner

*Primary Examiner* — Thanh Lam
(74) *Attorney, Agent, or Firm* — Fitch, Even, Tabin & Flannery, LLP

(57) ABSTRACT

An electric motor is provided that is configured for operation in hazardous or other hazardous environments. The electric motor includes a housing for a rotor and a stator. The housing includes a pair of end caps and a casing positioned therebetween. The end caps and the casing are held together using internal tie bars extending between and connected to the end caps.

20 Claims, 4 Drawing Sheets

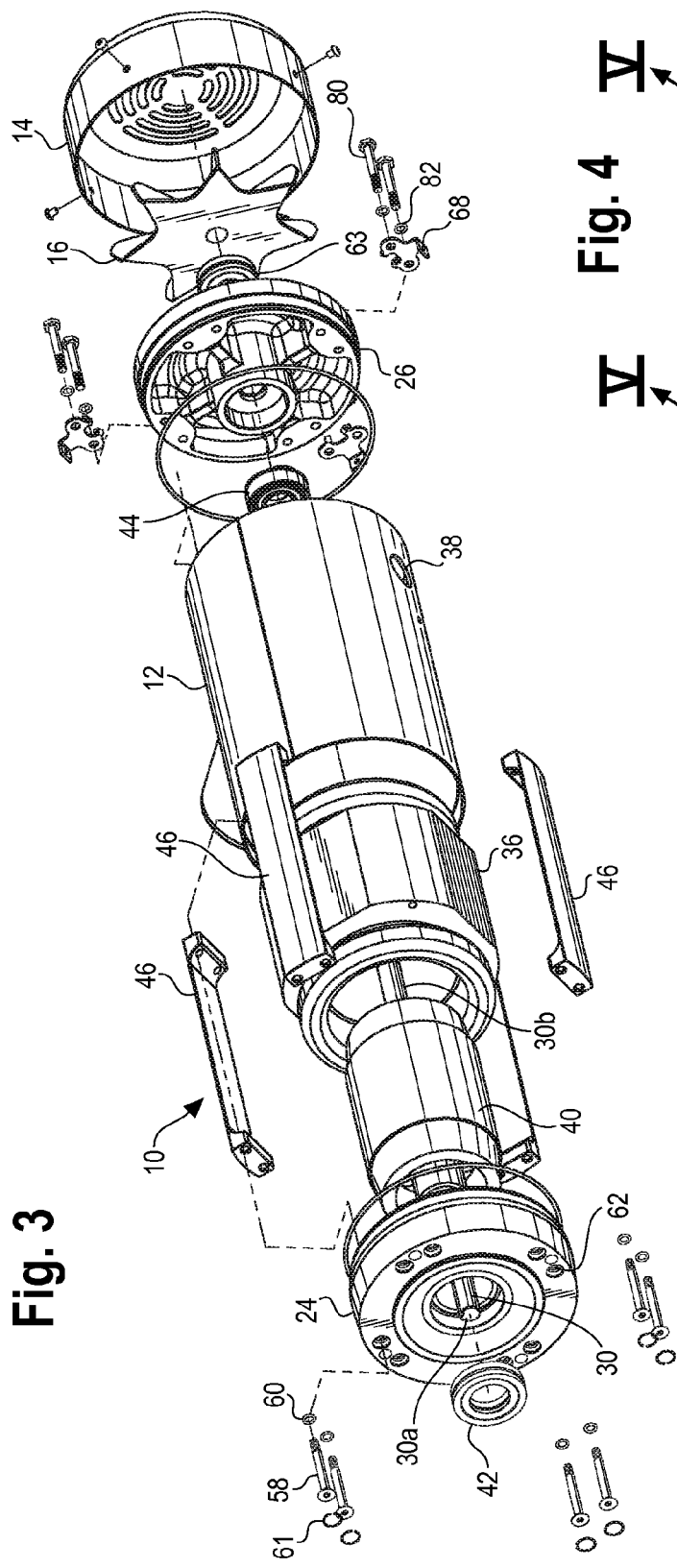
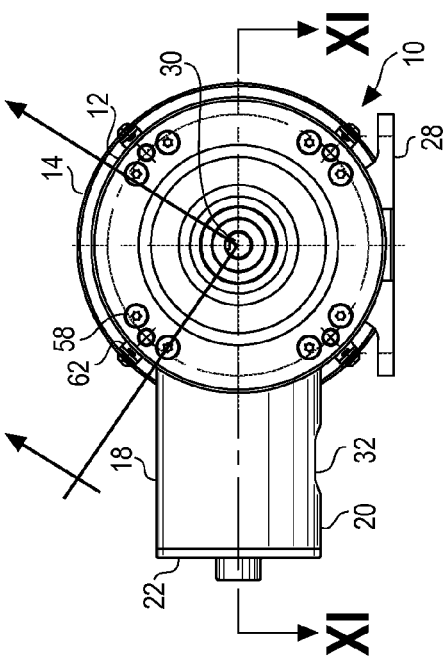

Fig. 5
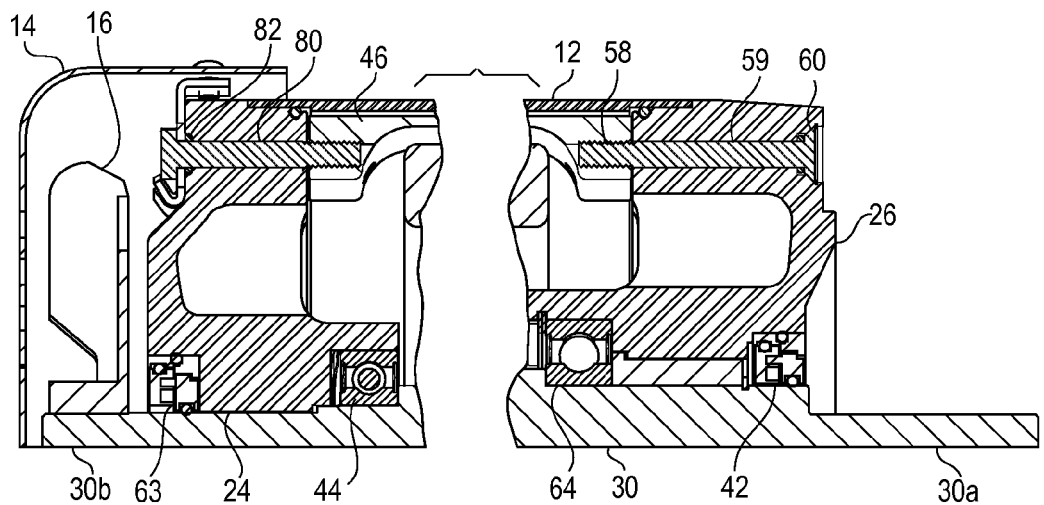
Fig. 6
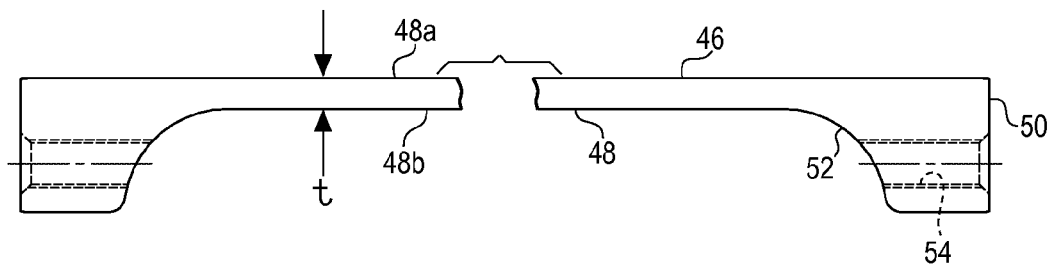
Fig. 7
Fig. 8
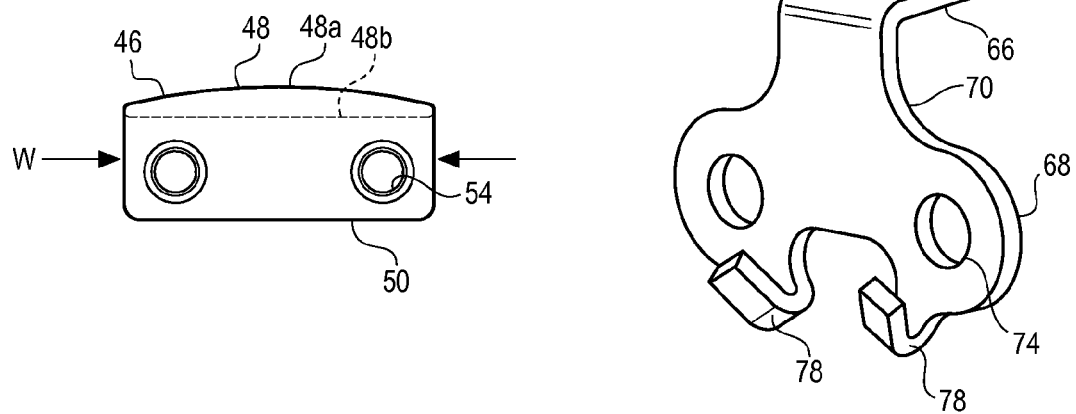

ELECTRIC MOTOR FOR USE IN HAZARDOUS ENVIRONMENTS

FIELD

This disclosure relates generally to an electric motor and, in particular, to an electric motor configured for use in hazardous environments.

BACKGROUND

Electric motors have applications where they are used in potentially hazardous environments. For instance, an electric motor may be used to drive mixers or pumps in environments where a risk of fire or explosion is normally present. Examples of such flammable environments can include pharmaceutical plants, such as where alcohol is used, chemical plants and food processing plants, such as grain plants. In such environments, pertinent standards and regulations can govern the types of electric motors than may be used. For example, Articles 500-504 of the NFPA 70 (National Electric Code) and Underwriter's Laboratories, Inc. Standard for Safety 674 set forth requirements for apparatus (which would include electric motors) to be used in "Hazardous Locations." The standards and regulations can require that the electric motor be enclosed in a case that is capable of withstanding an internal explosion of a gas or vapor and of preventing the ignition of a gas or vapor surrounding the case, such as by sparks, flashes, or explosion of the gas or vapor within the case. An additional requirement may be that the electric motor will operate at an external temperature that a surrounding flammable atmosphere will not be ignited by the electric motor. Such electric motors may be called "explosion-proof" motors.

A typical electric motor for use in hazardous environments has a housing including a cylindrical casing and a pair of end caps. Disposed within the housing is a rotor attached to a shaft. A stator surrounds the rotor. Electrical current is provided to the rotor and the stator in a manner which causes the rotor, and hence the shaft, to rotate relative to the stator. The casing is held between the pair of end caps using external, longitudinally-extending bolts, each extending between aligned ears of the end caps. One end of the shaft extends through one of the end caps for attachment to operating equipment, such as a mixer or pump. An opposite end of the shaft extends through the other of the end caps and may have a fan attached thereto for purposes of providing circulation for cooling the motor. A fan shroud may be attached to the other of the end caps for covering the fan. A generally rectangular terminal box may be attached to the exterior of the casing.

Environments where it is desirable to use an explosion-proof motor may also be environments where it is desirable to use an electric motor than can be easily cleaned. However, typical electric motors for use in hazardous environments, such as those described above include complex exterior geometries that can render the motors difficult to clean. In some instances, the complex exterior geometries can result in hard-to-reach areas where bacteria can be difficult to remove, a particular disadvantage in applications in the food and pharmaceutical industries. Some of the complex geometries in typical explosion-proof motors include the external tie bolts, the ears associated with the external tie bolts and the shape of the terminal box.

SUMMARY

An improved electric motor configured for use in both hazardous environments and hygienic environments is provided. The electric motor includes a housing having a casing positioned between a head end cap and a tail end cap. Disposed partially with the housing is an output shaft, with one end protruding from the head end cap for being connected to other equipment, such as a mixer or pump, and the other end protruding from the tail end cap for driving a cooling fan. With the housing, a rotor is attached to and rotates with the shaft. A stator surrounds the rotor. Advantageously, the main exterior components of the motor may be formed of stainless steel and the motor may be capable of being readily washed down for cleaning.

In one aspect, the typical exterior tie bolts are removed and substituted with inner tie bars extending between the end caps of the housing of the electric motor. Not only does this reduce the complexity of the exterior geometry of the motor, but it also reduces the free volume within the interior of the housing of the electric motor due to some of the volume being occupied by the tie bars. Reducing the free volume within the interior of the housing beneficially reduces the amount of space into which vapors or gasses can accumulate, and thereby reducing the force of an internal explosion and hence then strength and expense of the components of the motor.

In typical electric motors for use in hazardous environments, there is insufficient room for the external tie bolts to simply be moved internally. Increasing the diameter of the electric motor housing to accommodate internal tie bolts is not a simple matter of scaling up the diameters of the end caps and casing. In addition to the extra costs associated with increased size components, the components would need to be adjusted in order to withstand a larger explosion force within the housing. This is because enlarging the diameter of the housing to accommodate internal tie bolts would have the undesirable results of increasing the amount of free space within the housing. The larger the volume of free space within the housing, the larger volume of vapors and gasses that can accumulate therein. The larger the volume of explosive vapors and gasses, the greater the force of any internal explosion the components must be designed to withstand.

In another aspect, the external geometry of the terminal box is simplified, thereby resulting in easier cleaning of the exterior of the electric motor. Furthermore, the opening through which the operating wires of the stator and rotor must pass in order to enter the terminal box and be connected to a source of electrical power is configured to resist the passing of a flame therethrough.

These and other aspects are discussed below with reference to an exemplary embodiment of an improved electric motor and as illustrated in the drawings.

BRIEF DESCRIPTION OF THE DRAWINGS

FIG. 3 is an exploded perspective view of the electric motor of FIG. 1;

FIG. 4 is a front elevation view of the electric motor of FIG. 1;

FIG. 5 is a cross sectional view of the electric motor of FIG. 1 taken along line V-V of FIG. 4 and showing an internal tie bar extending between end caps of the housing;

FIG. 6 is a side elevation view of one of the internal tie bar of the electric motor of FIG. 1;

FIG. 7 is a front elevation view of the tie bar of FIG. 6;

FIG. 8 is a front perspective view of a bracket for use in mounting of the fan shroud to one of the end caps of the electric motor of FIG. 1;

DETAILED DESCRIPTION OF THE DRAWINGS

Figure 1:
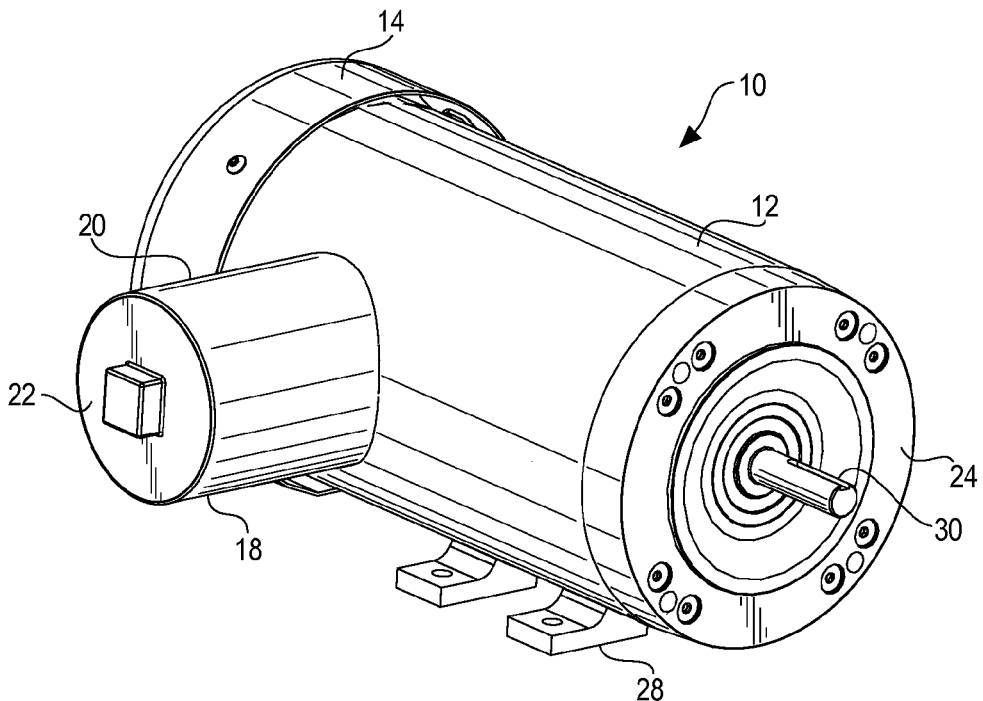
FIG. 1 is a front perspective view of an electric motor configured for use in hazardous environments, showing a housing, an output shaft at one end and a fan shroud at another end of the housing, and a closed terminal box extending from a side of the housing.
Figure 2:
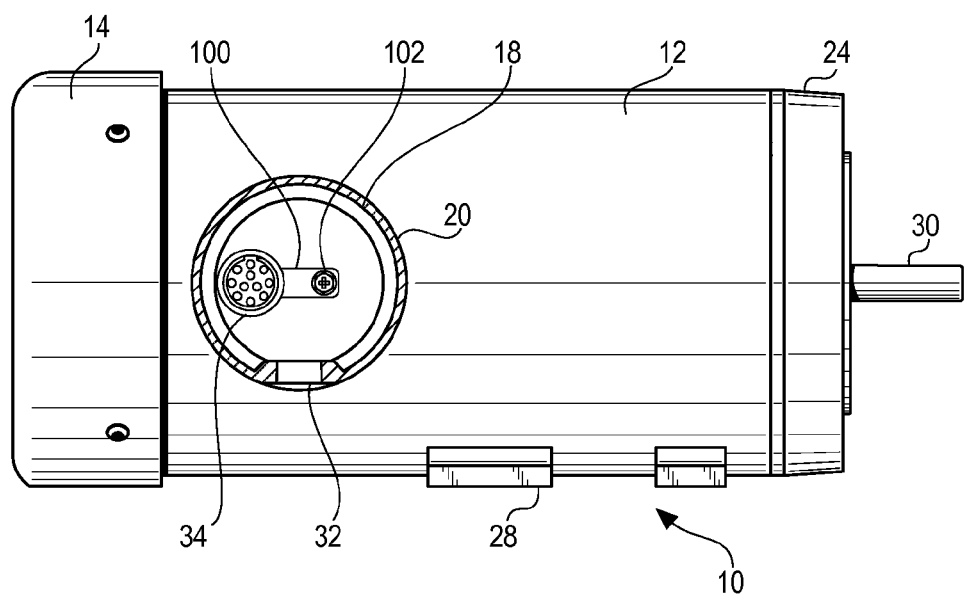
FIG. 2 is a left side elevation view of the electric motor of FIG. 1, showing the terminal box opened.

The electric motor 10 has a housing comprising a cylindrical casing 12 with a head cap 24 disposed at one end thereof and a tail cap 26 disposed at an opposite end thereof, as illustrated in FIGS. 1-3. Disposed within the housing are a rotor 40 attached to an output shaft 30 and a stator 36 which surrounds the rotor 40. A fan shroud 14 is attached to the tail cap 26 and encloses a fan 16 that is driven for rotation by the output shaft 30. The head cap 24 and tail cap 26 each have an annular shape, with a central opening through which an end of the output shaft 30 extends. More specifically, a drive end 30a of the output shaft 30 extends through a central opening in the head cap 24 and an opposite end 30b of the output shaft 30 extends through a central opening in the tail cap 26. The drive end 30a of the output shaft 30 can be configured to be connected to other equipment, such as a mixer or pump, for imparting a rotational movement to components thereof. The outwardly-facing surface of the head cap 24 may optionally include internally-threaded blind taps 62, as illustrated in FIG. 4, for facilitating attachment of the motor 10 to other equipment. The opposite end 30b of the output shaft 30 is adapted to drive the fan 16 in order to provide for circulation to cool the motor 10 during operation. A terminal box 18 is attached to the exterior of the casing 12, as illustrated in FIGS. 1, 2 and 4, and provides for electrical connection to the rotor 40 and/or stator 36. Feet 28 are attached to the underside of the casing 12 for use in mounting the motor 10 to a surface. Interior surfaces of the caps 24 and 26 may include raised ribs or fins for dissipating heat.

The output shaft 30 is supported for rotation relative to the head cap 24 and the end cap 26 using a pair of axially spaced bearings 44 and 64, as illustrated in FIGS. 3 and 5. More specifically, a bearing 44 is positioned between machined annulus of the tail cap 26 and the shaft 30 adjacent the opposite end 30b thereof and a bearing 64 is positioned between a machined annulus of the head cap 24 and the shaft 30 adjacent the drive end 30a thereof. Seals 42 and 63 surround the drive end 30a and the opposite end 30b of the output shaft 30, respectively, and are seated within annular recesses of the head cap 24 and tail cap 26, respectively, for sealing the openings of the caps 24 and 26 through which the shaft 30 extends. The rotor 40 is attached to the shaft 30 for rotation therewith, and the stator 36 is fixedly attached to the inner-facing surfaces of the caps 24 and 26.

Unlike conventional electric motors for use in hazardous environments, a plurality of internal tie bars 46 extend between the head cap 24 and the tail cap 26 to hold the components of the housing together, thereby sandwiching the casing 12 therebetween. The use of the internal tie bars 46, as opposed to conventional external tie bolts, advantageously reduces complex geometries on the exterior of the motor 10 for improved ability to clean while also reducing free space within the housing and thereby reducing the volume of potentially explosive vapors and gasses that can be disposed within the housing.

Also unlike conventional electric motors for use in hazardous environments, the motor 10 is configured for use in hygienic environments, which may also be hazardous environments. One way of configuring the motor 10 is to reduce the number of complex geometries of the exterior of the housing. This is accomplished in part by providing the tie bars 46 within the interior of the casing 12, as opposed to the typical external tie rods. This is also accomplished in part by providing a cylindrical sleeve 20 for the terminal box 18, as opposed to more typical rectangular terminal box construction. Another way of configuring the motor 10 for use in hygienic environments is to form exterior surfaces from stainless steel, such as the caps 24 and 26, exterior surfaces of the terminal box 18 and the casing 12.

Figure 9:
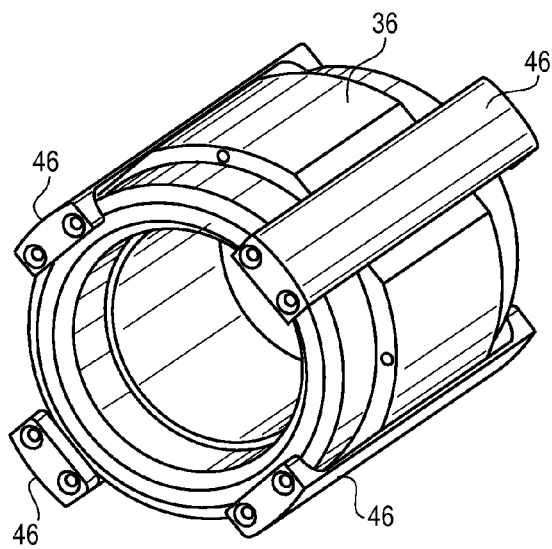
FIG. 9 is a front perspective view of a stator and internal tie bar arrangement of the electric motor of FIG. 1.
Figure 10:
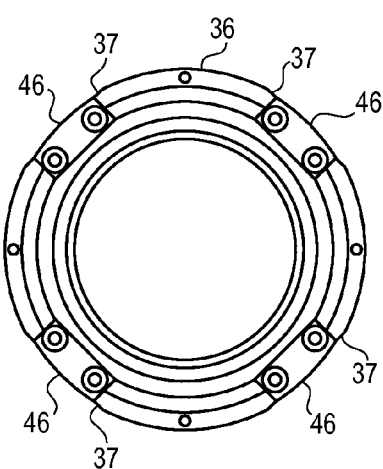
FIG. 10 is a front elevation view of the stator and tie bar arrangement of FIG. 9.

The tie bars 46 are dimensioned to be partially recessed within indentations 37 formed on the exterior of the stator 36, as illustrated in FIGS. 9 and 10. This advantageously utilizes extra space available within a given motor housing construction without requiring the casing to have a larger diameter, while also occupying free space within the housing and thereby decreasing of the free space available for vapors or gasses to accumulate. The number of tie bars 46 can vary depending upon the requirements and strength necessary for holding the housing together, as well as the number of indentations 37 formed in the outer surface of the stator 36. In the example illustrated in the drawings, there are four tie bars 46 each positioned partially within one of four indentations 37 in the stator 46, as illustrated in FIGS. 9 and 10.

Turning to more of the details of the tie bars 46, the tie bars 46 include a central segment 48 positioned between a pair of enlarged end segments 50, as illustrated in FIGS. 6 and 7. The central segment 48 has a comparatively narrow thickness t as compared to the width w. For example, the thickness t may be less than half the width w, and may be a fourth or up to a twelfth and beyond the size of the width w. The size of the central segment 48 of the tie bar 46 may optionally be selected to at least partially be recessed with the indentations 37 positioned along the exterior of the stator 36. The size of the central segment 48 of the tie bar 46 may also optionally be selected to abut against the indentations 37 positioned along the exterior of the stator 36 and the inner diameter of the casing 12. The shape of the central segment 48 of the tie bar 46 may be configured to fit closely with any abutting surfaces. For example, the top side 48a of the central segment 48 may be arcuate in the direction of its width w, as illustrated in FIG. 7, in order to abut against a portion of the inner diameter of the casing 12, and may have the same radius of curvature. The underside 48b of the central segment 48 of the tie bar 46 may be generally planar so as to but against a generally planar bottom of the indentation 37 of the stator 36. While examples of certain shapes for the central segment 48 of the tie bar 46 are described herein, other suitable shapes can be selected so as to be complementary with abutting surfaces. The enlarged end segments 50 of the tie bars 46 are configured to be attached to the adjacent head cap 24 or tail cap 26 using screws 58, bolts, or other such fasteners (hereinafter referred to as screws). The enlarged end segments 50 are joined to the central segment 48 via arcuate transition regions 52, as illustrated in FIG. 6. The tops of the enlarged end segments 50 are aligned with the top side 48a of the central segment 48a and have the same shape, and the bottoms of the enlarged end segments 50 are connected to the underside 48b of the central section 48 via a radial segment 52. A pair of through-holes 54 is formed in each of the enlarged end segments 50 for receiving the screws 58, and may have internal threads for engagement with external screw threads on the screws 58.

The annular head cap 24 and end cap 26 each have a plurality of through-holes 59 through which the screws 58 can extend from the exterior of the caps 24 and 26 and into the through-holes 54 in the enlarged end segments 50 of the tie bars 46, as illustrated in FIG. 5. In this manner, the head cap 24 can be secured relative to the end cap 26 with the cylindrical casing 12 therebetween. A radial groove or notch may be machined in the outer diameter of each of the caps 24 and 26 for receiving the adjacent end of the casing 12, as illustrated in FIG. 5, and may form a step with the remainder of the cap 24 or 26 against which the casing 12 can abut. An elastomeric O-ring is associated with each of the caps 24 and 26 and positioned to engage the casing 12 to form a seal therebetween. The purpose of the O-rings is to seal the housing against the ingress of liquids, which can potentially harm electrical and mechanical components within the housing, such as the rotor 40, stator 34 and ball bearings 44 and 64.

The screws 58 can have an enlarged head at one end attached to a shaft or shank having an externally-threaded region at an opposite end for use with the internally-threaded through-holes 54 of the tie bars 46. The screws 58, and specifically the screws 58 associated with the head cap 24, can have countersunk, flat heads that are configured to fit into countersinks formed at the outwardly-facing sides of the head cap 24 and surrounding the through-holes 59. In order to further isolate the interior of the housing from the external environment, elastomeric O-ring seals 60 are positioned between the screws 58 and the through-holes 59 and, in the specific case of the screws 58 associated with the head cap 24, between the head of the screw and the countersink in the cap 24 or 26. The O-rings 60 seal against the ingress of liquids and vapors into the housing at that location. For the head cap 24, an annular groove may be formed at the intersection of the through-holes 59 and their respective countersinks for receiving the O-rings 60. For the tail cap 26, the annular groove may be formed at the intersection of the through-holds and the exterior of the tail cap 26.

Devices are provided for restricting the removal of the screws 58. A snap ring 61 is positioned to restrict removal of the screws 58 extending through the through-holes 59 of the head cap 24, as illustrated in FIGS. 3 and 5. In particular, an annular groove is be formed in the caps 24 or 26 surrounding the through-holes 59 of the head cap 24 for receiving a snap ring 61 positioned to be between the head of the screw 58 and the outer face of the cap 24 for restricting removal of the screw 58. A shroud bracket 66 has a segment positioned to restrict removal of the screws 58 extending through the through-holes of the tail cap 24, as illustrated in FIG. 3 and as will be discussed in greater detail below. In addition to restricting removal of the screws 58 associated with the tail cap 26, the shroud bracket 66 also provides a support to which the fan shroud 14 can be mounted. The shroud bracket 66 is attached to the tail cap 26 using the same screws 58 that are used to attach the tie bars 46 to the tail cap 26. This is advantageous because separate holes do not need to be formed in the tail cap 26 for attachment of the fan shroud 14.

Turning now to more of the details of the shroud bracket 66, and with reference to FIG. 8, the shroud bracket 66 has a generally planar body portion 68 with a pair of through apertures 74 through which the shanks of the screws 58 can pass but not the heads, as illustrated in FIG. 5. The body portion 68 is connected via a narrow neck 70 to a generally planar shroud mount 72 having an aperture 76 therethrough for receiving a screw for mounting of the fan shroud 14. The shroud mount 72 is positioned generally perpendicularly relative to the body portion 68 of the shroud bracket 66. The body portion 68 of the shroud bracket 66 has a pair of generally rectangular portions 78 extending from an opposite side from the neck 70. The rectangular portions 78 are dimensioned so that they can be folded to position their distal edges against or close to the head of the screws 58 extending through the through-holes 59 of the tail cap 26, as illustrated in FIG. 5. While the screws 58 associated with the head cap 24 have flat heads, the screws 58 associated with the tail cap 26 have a hex head such that the distal edges of the rectangular portions 78 can engage with the hex head to restrict rotation and thus removal of the screw 58.

Figure 11:
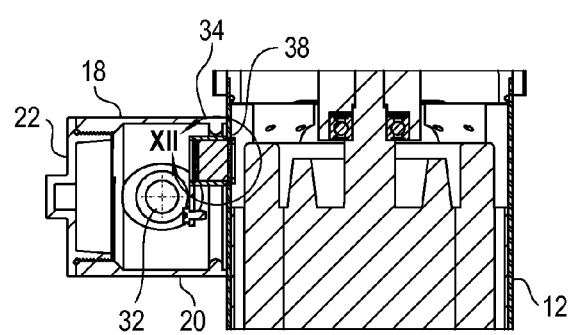
FIG. 11 is a cross sectional view of the electric motor of FIG. 1 taken along line XI-XI of FIG. 4 and showing internal components of the terminal box, including an electrical connection junction.
Figure 12:
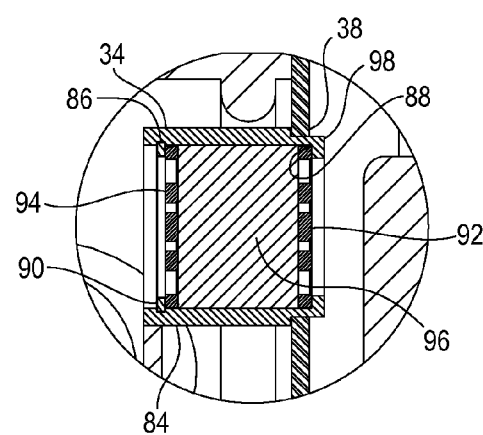
FIG. 12 is a detailed view of the electrical connection junction taken from region XII of FIG. 11.

Turning next to the details of the terminal box 18, the terminal box 18 is constructed of a cylindrical sleeve 20 welded to the side of the casing 12 of the housing, as illustrated in FIG. 4. The sleeve 20 surrounds an opening 38 formed in the casing 12, as illustrated in FIGS. 11 and 12. The opening 38 in the casing 12 is provided so that operating wires can pass into the housing to power the rotor 40 and the stator 36 and cause the shaft 30 to rotate. The operating wires (not shown) pass from an interior of the housing through the opening 38 in the casing 12 and an electric connection junction 34 extending through the opening 38. The operating wires can exit the terminal box 18 via an exit opening 32 formed in the sleeve 20. A ground screw 102 can be attached via an extension 100 in turn attached to the junction 34, as illustrated in FIG. 2. An externally-threaded cap 22 is used to close the terminal box 18. Opposite the end of the sleeve 20 welded to the casing 12 is an internally-threaded end portion configured for receiving external threads of the cap 22. The cap 22 can include a feature for use in turning the cap 22, such as a raised rectangular protrusion (as opposed to an internal recess which could potentially provide a more complex geometry for cleaning). The terminal box 18 is also sealed, such as by using an elastomeric O-ring associated with the cap 22, so that liquids and vapors are restricted from ingress. Furthermore, a close fit between the threaded engagement between the cap 22 and the sleeve 20 of the terminal box 18 creates a long and narrow path through which flames can be quenched prior to exiting the terminal box 18.

The purpose of the junction 34 is to facilitate isolation of the interior of the housing from an interior of the terminal box 18, which still permitting the operating wires to extend from within the housing. Preferably, the junction 34 can prevent a flame within the housing from escaping into the terminal box 18. With reference to FIG. 12, the junction 34 is formed of a hollow sleeve 84 having an end region of reduced diameter 98, thereby forming a step adjacent the larger diameter region. The step is used to limit the extent to which the junction 34 can be inserted into the opening 38 of the casing 12, as illustrated in FIG. 12. More specifically, the end region of reduced diameter 98 is sized to fit into the opening 38 of the casing 12, but not the remainder of the junction 34 past the step. The fit between the opening 38 of the casing 12 and the end region of reduced diameter 98 of the junction 34 may be welded to the casing 12 to preferably form a seal between the casing 12 and the exterior of the junction 34 to prevent liquids, flames, vapors and gasses from passing therebetween, while also restricting the removal of the junction 34 from the housing in the event of an internal explosion within the housing.

A pair of plates 92 and 94 is positioned in an axially spaced relationship within the sleeve 84 of the junction 34. The purpose of the plates 92 and 94 is to maintain the operating wires in a spaced relation as they pass through the junction 34. To this end, the plates 92 and 94 each have a plurality of apertures extending therethrough, each sized to fit one of the operating wires. The space between the plates 92 and 94 is filed with a material that solidifies into a blocking mass 96, such as a potting compound, to both maintain the wires in a spaced relation and to fill the voids between the wires so as to block liquids, flames, vapors and gasses from ingress and egress through the junction 34. The junction 34 is configured to retain the plates 92 and 94 within the sleeve 84. For the innermost plate 92, closest to the end region of reduced diameter 98 of the junction 34, the end region 98 includes a radially-inward extending flange 88 at its tip. The flange 88 prevents the innermost plate 92 from moving toward the outermost plate 94. The blocking mass 96 prevents the innermost plate 92 from moving away from the interior of the housing. For the outermost plate 94, an annular groove 86 is formed in the inner diameter of the sleeve 84 of the junction 34 proximate the end of the sleeve 84 opposite the opening 38 of the casing 12. A clip ring 90 is snapped into place partially within the groove 86 to prevent the outermost plate 94 from moving outward into the interior of the junction 34. The blocking mass 96 prevents the outermost plate from moving toward the innermost plate 92.

From the foregoing, it should be apparent that the exemplary electric motor 10 described herein improves upon conventional electric motors suitable for use in hazardous environments by moving the tie bars 46 to the interior of the housing, as well as reducing complex geometries on the exterior of the motor 10. While a particular example of the electric motor has been illustrated and described, it should be apparent that modifications and variations can be made without departing from the spirit and scope of the inventions as defined by the following claims.

The invention claimed is:

1. An electric motor for use in hazardous environments, the electric motor comprising:
   a housing having a casing positioned between a head end cap and a tail end cap;
   an output shaft;
   a rotor attached relative to the output shaft and disposed within the housing;
   a stator at least partially surrounding the rotor and disposed within the housing, the stator including a plurality of axially-extending indentations; and
   a plurality of ties each extending between the head end cap and the tail end cap to hold the head end cap, tail end cap and casing together, the ties being positioned internally relative to the casing and configured to be at least partially recessed within respective ones of the indentations, wherein the ties each have a middle portion with a width measured transverse to a longitudinal axis of the motor and a thickness measured in an outwardly direction from the axis, the width being substantially greater than the thickness.

2. An electric motor for use in hazardous environments, the electric motor comprising:
   a housing having a casing positioned between a head end cap and a tail end cap;
   an output shaft;
   a rotor attached relative to the output shaft and disposed within the housing;
   a stator at least partially surrounding the rotor and disposed within the housing, the stator including a plurality of axially-extending indentations; and
   a plurality of ties each extending between the head end cap and the tail end cap to hold the head end cap, tail end cap and casing together, the ties being positioned internally relative to the casing and configured to be at least partially recessed within respective ones of the indentations;
   wherein the ties are each attached to the head end cap and tail end cap using a plurality of screws passing through screw openings from outwardly sides of the end caps to inwardly, facing sides of the end caps; and
   wherein the ties have enlarged portions adjacent each end thereof having a thickness substantially greater than the thickness of a middle portion and configured to receive the screws.

3. An electric motor for use in hazardous environments, the electric motor comprising:
   a housing having a casing positioned between a head end cap and a tail end cap;
   an output shaft;
   a rotor attached relative to the output shaft and disposed within the housing;
   a stator at least partially surrounding the rotor and disposed within the housing, the stator including a plurality of axially-extending indentations; and
   a plurality of ties each extending between the head end cap and the tail end cap to hold the head end cap, tail end cap and casing together, the ties being positioned internally relative to the casing and configured to be at least partially recessed within respective ones of the indentations;
   wherein the ties are each attached to the head end cap and tail end cap using a plurality of screws passing through screw openings from outwardly sides of the end caps to inwardly, facing sides of the end caps; and
   wherein annular seats are formed in the outwardly facing sides of the end caps surrounding the screw openings for receiving O-rings, the annular seats having a diameter less than an outermost diameter of heads of the screws.

4. An electric motor for use in hazardous environments, the electric motor comprising:
   a housing having a casing positioned between a head end cap and a tail end cap;
   an output shaft;
   a rotor attached relative to the output shaft and disposed within the housing;
   a stator at least partially surrounding the rotor and disposed within the housing, the stator including a plurality of axially-extending indentations; and
   a plurality of ties each extending between the head end cap and the tail end cap to hold the head end cap, tail end cap and casing together, the ties being positioned internally relative to the casing and configured to be at least partially recessed within respective ones of the indentations;
   wherein the ties are each attached to the head end cap and tail end cap using a plurality of screws passing through screw openings from outwardly sides of the end caps to inwardly, facing sides of the end caps; and
   wherein the screws passing through the tail end cap attach shroud brackets relative to the tail end cap, the shroud brackets being configured to have a fan shroud mounted thereto.

5. The electric motor of claim 4, wherein each of the shroud brackets includes a base portion having at least one aperture through which one of the screws can pass and a flange portion for connection of the fan shroud.

6. The electric motor of claim 5, wherein each of the shroud brackets includes a locking portion movable relative to the base portion to a position whereby rotation of a head of the screw is restricted by the locking portion.

7. An electric motor for use in hazardous environments, the electric motor comprising:
   a housing having a casing positioned between a head end cap and a tail end cap;
   an output shaft;
   a rotor attached relative to the output shaft and disposed within the housing;
   a stator at least partially surrounding the rotor and disposed within the housing;
   a plurality of ties each extending between the head end cap and the tail end cap to hold the head end cap, tail end cap and casing together, the ties being positioned internally relative to the casing; and
   a terminal box welded to the casing, the terminal box having a removable cover and enclosing an electrical connection junction having operating wires extending through an opening in the casing for providing electricity to the stator and/or rotor.

8. The electric motor of claim 7, wherein the terminal box has an opening for receiving external wires for connecting to the electrical connection junction.

9. The electric motor of claim 8, wherein the electrical connection junction has a first plate facing an interior of the terminal box and a second plate facing the opening the casing, the space between the plates being at least substantially filled with a potting compound.

10. The electric motor of claim 9, wherein the operating wires extend through apertures in the plates and through the space between the plates.

11. The electric motor of claim 10, wherein the casing is generally cylindrical and the terminal box is generally cylindrical, the longitudinal axis of the terminal box being generally perpendicular to the longitudinal axis of the casing.

12. The electric motor of claim 10, wherein:
   the opening in the casing is generally circular, the electrical connection junction is generally cylindrical and has a first portion with a first diameter and a second portion with a second diameter, the second diameter being less than the first diameter and being sized to be inserted into the opening of the casing; and
   the first portion and second portion of the electrical connection junction are adjacent such that an external step is created therebetween, the external step being positioned to abut an exterior region of the casing surrounding the opening of the casing.

13. The electric motor of claim 12, wherein:
   a retaining flange is positioned on the second portion of the electrical connection junction and extends radially inward to retain the second plate from passing through the electrical connection junction to the interior of the casing; and
   an internal circumferential groove is formed in the first portion of the electrical connection junction for receiving a retaining ring to retain the first plate from passing through the electrical connection junction to the interior of the terminal box.

14. An electric motor for use in hazardous environments, the electric motor comprising:
   a housing having a casing positioned between a head end cap and a tail end cap;
   an output shaft;
   a rotor attached relative to the output shaft and disposed within the housing;
   a stator at least partially surrounding the rotor and disposed within the housing;
   an electrical connection junction extending from an exterior of the housing through an opening in the casing;
   operating wires extending through the electrical connection junction for conducting electricity to the stator and/or rotor, the electrical connection junction having a region surrounding the operating wires and filled with a blocking material to substantially prevent a flame from exiting the housing through the opening thereof and through the electrical connection junction; and
   a terminal box attached to an exterior of the casing and surrounding the electrical connection junction exteriorly of the casing.

15. The electric motor of claim 14, wherein a plurality of ties each extend between the head end cap and the tail end cap to hold the head end cap, tail end cap and casing together, the ties being positioned internally relative to the casing.

16. The electric motor of claim 15, wherein the stator includes a plurality of axially-extending indentations and the ties are configured to be at least partially recessed within respective ones of the indentations.

17. The electric motor of claim 16, wherein the electrical connection junction has a first plate facing an interior of the terminal box and a second plate facing the opening the casing, the space between the plates being filled with the blocking material, the operating wires extending through apertures in the plates and through the space between the plates, the electrical connection junction having means for retaining the plates.

18. The electric motor of claim 2, wherein the ties each have a middle portion with a width measured transverse to a longitudinal axis of the motor and a thickness measured in an outwardly direction from the axis, the width being substantially greater than the thickness.

19. The electric motor of claim 7, wherein the ties each have a middle portion with a width measured transverse to a longitudinal axis of the motor and a thickness measured in an outwardly direction from the axis, the width being substantially greater than the thickness.

20. The electric motor of claim 19, wherein the ties have enlarged portions adjacent each end thereof having a thickness substantially greater than the thickness of the middle portion.

* * * * *